United States Patent
Harada et al.

(10) Patent No.: US 6,770,119 B2
(45) Date of Patent: Aug. 3, 2004

(54) MERCURY REMOVAL METHOD AND SYSTEM

(75) Inventors: Masahiro Harada, Tokyo (JP); Shintaro Honjo, Hiroshima (JP); Makoto Suzaki, Tokyo (JP); Kazuo Ishida, Tokyo (JP); Hajime Nagano, Tokyo (JP); Susumu Okino, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 49 days.

(21) Appl. No.: 10/233,526

(22) Filed: Sep. 4, 2002

(65) Prior Publication Data

US 2003/0082085 A1 May 1, 2003

(30) Foreign Application Priority Data

Oct. 31, 2001 (JP) ........................................ 2001-333972

(51) Int. Cl.[7] .............................................. B01D 53/14
(52) U.S. Cl. ............................. 95/92; 95/134; 95/234; 423/99; 423/210; 423/242.7
(58) Field of Search ............................ 95/92, 94, 134, 95/234, 172, 177; 96/234; 423/210, 242.7, 215.5, 99, 101, 109

(56) References Cited

U.S. PATENT DOCUMENTS

| | | | |
|---|---|---|---|
| 3,193,987 A | * | 7/1965 | Manes et al. .................. 95/134 |
| 3,661,509 A | | 5/1972 | Ferrara et al. |
| 3,755,989 A | * | 9/1973 | Fornoff et al. .................. 95/134 |
| 3,790,535 A | * | 2/1974 | Motani et al. ............... 528/487 |
| 3,961,031 A | * | 6/1976 | Yasui et al. .................. 423/210 |
| 4,044,098 A | | 8/1977 | Miller et al. |
| 4,491,461 A | * | 1/1985 | Hoekstra ...................... 62/635 |
| 4,500,327 A | | 2/1985 | Nishino et al. |
| 4,591,490 A | | 5/1986 | Horton |
| 4,843,102 A | * | 6/1989 | Horton ......................... 521/28 |
| 4,863,489 A | | 9/1989 | Suggitt |
| 4,895,708 A | | 1/1990 | Yan |
| 4,982,050 A | * | 1/1991 | Gammie et al. ............. 585/818 |
| 5,096,673 A | * | 3/1992 | Gammie et al. ............. 422/198 |
| 5,141,724 A | * | 8/1992 | Audeh et al. ................ 423/210 |
| 5,419,884 A | * | 5/1995 | Weekman et al. ........... 423/210 |
| 5,695,726 A | * | 12/1997 | Lerner ......................... 423/210 |
| 6,350,372 B1 | * | 2/2002 | Degnan et al. .......... 208/251 R |
| 2003/0082085 A1 | * | 5/2003 | Harada et al. ............... 423/210 |

FOREIGN PATENT DOCUMENTS

WO    WO 00/69991    11/2000

* cited by examiner

*Primary Examiner*—Duane S. Smith
(74) *Attorney, Agent, or Firm*—Oblon, Spivak, McClelland, Maier & Neustadt, P.C.

(57) ABSTRACT

The present invention provides a mercury removal method which can effectively remove very small amounts of mercury components present in a gas during wet gas purification such as coal or heavy oil gasification gas purification and petroleum refining. A mercury removal method for the removal of mercury present in a gas, the method comprising the steps of bringing a gas containing at least mercury and not less than 10 ppm of hydrogen sulfide into gas-liquid contact with an absorbing fluid under pressurized conditions so as to cause mercury to pass into the absorbing fluid; flashing the mercury-containing absorbing fluid under lower-pressure conditions to separate it into gaseous components and liquid components; and removing the mercury contained in the separated gaseous components by adsorption to an adsorbent.

10 Claims, 4 Drawing Sheets

MERCURY REMOVAL METHOD AND SYSTEM

FIELD OF THE INVENTION

This invention relates to a mercury removal method and system for use in wet gas purification. More particularly, it relates to a mercury removal method which can effectively remove very small amounts of mercury components present in a gas during wet gas purification such as coal or heavy oil gasification gas purification and petroleum refining.

BACKGROUND OF THE INVENTION

Exhaust gas from coal-fired thermal electric power plants contains mercury originating from coal. This mercury cannot be completely removed in a conventional flue gas treatment system (including an electrostatic precipitator, a wet flue gas desulfurizer and the like), and some of it is discharged therefrom. Since mercury is a trace component and has a very high vapor pressure and, in particular, metallic mercury has the property of being insoluble in water, it is difficult to remove mercury by recovering it with a dust collector or by washing the gas with a scrubber.

A large amount of mercury is discharged from conventional waste disposal by incineration or the like, but the scale of disposal is relatively small and produces a small volume of gas. Accordingly, such mercury has frequently been treated, for example, by adsorption using activated carbon. While treating methods involving adsorption by activated carbon are effective methods for the removal of such mercury, they are not suitable for practical use in the treatment of a large volume of gas because an enormous consumption cost is required.

Consequently, a mercury removal method has been proposed in which an oxidizing agent is sprayed, for example, in a mist eliminator (M/E) installed downstream of a flue gas desulfurizer. Since it is difficult to use activated carbon in thermal electric power plants for the above-described reason, this method provides a more convenient means for removing mercury by spraying an oxidizing agent in a mist eliminator.

Moreover, a process has been proposed in which metallic Hg is oxidized to $HgCl_2$ on a catalyst such as a denitration catalyst and this $HgCl_2$ is removed in a flue gas desulfurizer.

Mercury exists chiefly in two forms: metallic mercury (Hg) of zero valence and mercury chloride ($HgCl_2$). While metallic mercury is hardly soluble in water, mercury chloride is relatively soluble in water. Thus, mercury in the form of mercury chloride can be removed by means of a desulfurizer. Accordingly, metallic mercury of zero valence can be removed by oxidizing it to mercury chloride with the aid of an oxidizing agent.

In this process, therefore, a chlorinating agent such as $Cl_2$ or HCl is added and sprayed just before a denitration catalyst within a denitrator, so that metallic mercury is oxidized on the denitration catalyst.

In ordinary exhaust gases, all mercury is not present in the form of metallic mercury. A certain proportion thereof is present in the form of mercury chloride because coal has a high chlorine content, and this mercury component can be removed. Accordingly, a chlorinating agent may be used for the remaining metallic mercury.

However, examination of the mercury contained, for example, in coal or heavy oil gasification gas has revealed that almost all mercury is present as metallic mercury under a reducing atmosphere and little is dissolved in water. Accordingly, if an oxidizing agent is sprayed under an atmosphere of a reducing gas during wet gas purification, the oxidizing agent will be wasted owing to the presence of various reducing substances and cannot be expected to produce any beneficial effect.

Moreover, if a chlorinating agent is continuously sprayed to induce a reaction on the catalyst, a gasification gas having a high ammonia content and a high pressure undergoes the reaction of ammonia with HCl resulting in the precipitation of ammonium chloride ($NH_4Cl$). This ammonium chloride may cause a problem in that it is likely to accumulate in such units as GGHs and block them up.

SUMMARY OF THE INVENTION

In view of the above-described problems, the present inventors made intensive investigations in order to develop a mercury removal method which can remove mercury, as a trace component in gases, effectively and efficiently, which can reduce the mercury removal cost resulting from the operation of the system, and which requires a simplified procedure and system and can hence be carried out easily.

As a result, the present inventors have now found that the coexistence of $H_2S$ in a gasification gas causes metallic mercury to pass into water and that the so-collected is released into the gaseous phase when the water is exposed to a lower pressure (or flashed). That is, in the case of wet gas purification, the coexistence of hydrogen sulfide in the water washing step permits Hg to pass into the absorbing fluid and be removed thereby, and the Hg captured in the water washing step can be released into the gaseous phase by returning the Hg-containing waste water from the elevated pressure to atmospheric pressure. Thus, it has also been found that the above-described problems can be solved by removing mercury according to a method utilizing such phenomena. The present invention has been completed from this point of view.

Specifically, the present invention provides a mercury removal method for the removal of mercury components present in a gas during wet gas purification, the method comprising a water washing step for bringing a gas containing mercury components into contact with an absorbing fluid under pressurized conditions including the presence of not less than 10 ppm and preferably not less than 100 ppm of hydrogen sulfide so as to cause mercury components to pass from the gas into the absorbing fluid; a flashing step subsequent to the water washing step, for spraying the discharged absorbing fluid under a lower pressure to separate it into gaseous components and waste water; and an adsorption removal step for passing the gaseous components through a mercury remover provided with an adsorbent to remove mercury components therefrom by adsorption. In this mercury removal method, it is preferable to dissolve mercury components in the absorbing fluid, for example, under an elevated pressure of 0.2 to 5.0 MPa and in the coexistence of about 500 ppm to 10% of hydrogen sulfide, and remove the flashed mercury components by adsorption to activated carbon used as the adsorbent. Preferably, the activated carbon has an S component deposited thereon.

The present invention also provides a mercury removal system for the removal of mercury present in a gas during wet gas purification, the system comprising a water washing tower in which a gas containing both mercury components and hydrogen sulfide is introduced thereinto and an absorbing tower is circulated through the tower under pressurized conditions so as to cause mercury components to pass into the absorbing fluid; a flash drum in which the absorbing fluid discharged from the water washing tower is sprayed under a lower pressure to separate it into gaseous components and waste water; and a mercury remover provided with an adsorbent in which the mercury components present in the gaseous components are removed by adsorption. Typically, the aforesaid water washing tower comprises a gas cooling tower and a gas cleaning tower. In this system having a flash drum and a mercury remover installed on the downstream side of the water washing tower, about 50 to 95% of the mercury present in the formed gas introduced into the system can be removed.

The present invention also provides the above-described system that further comprises a hydrogen sulfide absorption tower in which the water-washed gas fed from the aforesaid water washing tower introduced thereinto and an absorbing fluid containing an amine compound is used to remove hydrogen sulfide by absorption into the absorbing fluid; a second flash drum in which the absorbing fluid discharged from the hydrogen sulfide absorption tower is sprayed under a lower pressure to separate it into gaseous components and an absorbing fluid to be fed to a regeneration tower; and a mercury remover provided with an adsorbent in which the mercury components present in the gaseous components delivered from the second flash drum are removed by adsorption. In this system having a flash drum and a mercury remover installed on the downstream side of the hydrogen sulfide absorption tower, about 50 to 95% of the mercury present in the water-washed gas introduced into the hydrogen sulfide absorption tower can be removed.

In the present invention, Hg can be removed by the coexistence of hydrogen sulfide in the water washing tower of the system. That is, if the gas being treated is a system involving the coexistence of hydrogen sulfide, Hg passes into the water present in the water washing tower and can hence be removed from the gas. As a result, Hg is contained in waste water discharged from the water washing tower.

When the collected Hg-containing waste water is returned from the elevated pressure to atmospheric pressure, Hg is released into the gaseous phase. Specifically, Hg is dispersed into the gaseous phase by passing the waste water through a flash drum.

Since hydrogen sulfide is usually present in a gasification gas subjected to gas purification, Hg present in the gas passes into an absorbing fluid within a water washing tower. After this absorbing fluid is passed through a flash drum to recover gaseous components, Hg can be adsorbed and captured by passing the gaseous components through an adsorbent. The present invention comprises a system in which Hg-containing gaseous components separated by flashing is passed through an adsorbent to remove mercury therefrom by means of the adsorbent. Thus, as compared with the case in which the whole gasification gas is directly treated with an adsorbent prior to its introduction into the system, Hg can be removed by treating a much smaller volume of gas, and the operating cost required for treatment with an adsorbent can be markedly reduced.

Thus, the present invention makes it possible to remove mercury, as a trace component in gases, effectively and efficiently and also to reduce the mercury removal cost resulting from the operation of the system.

Figure 1:
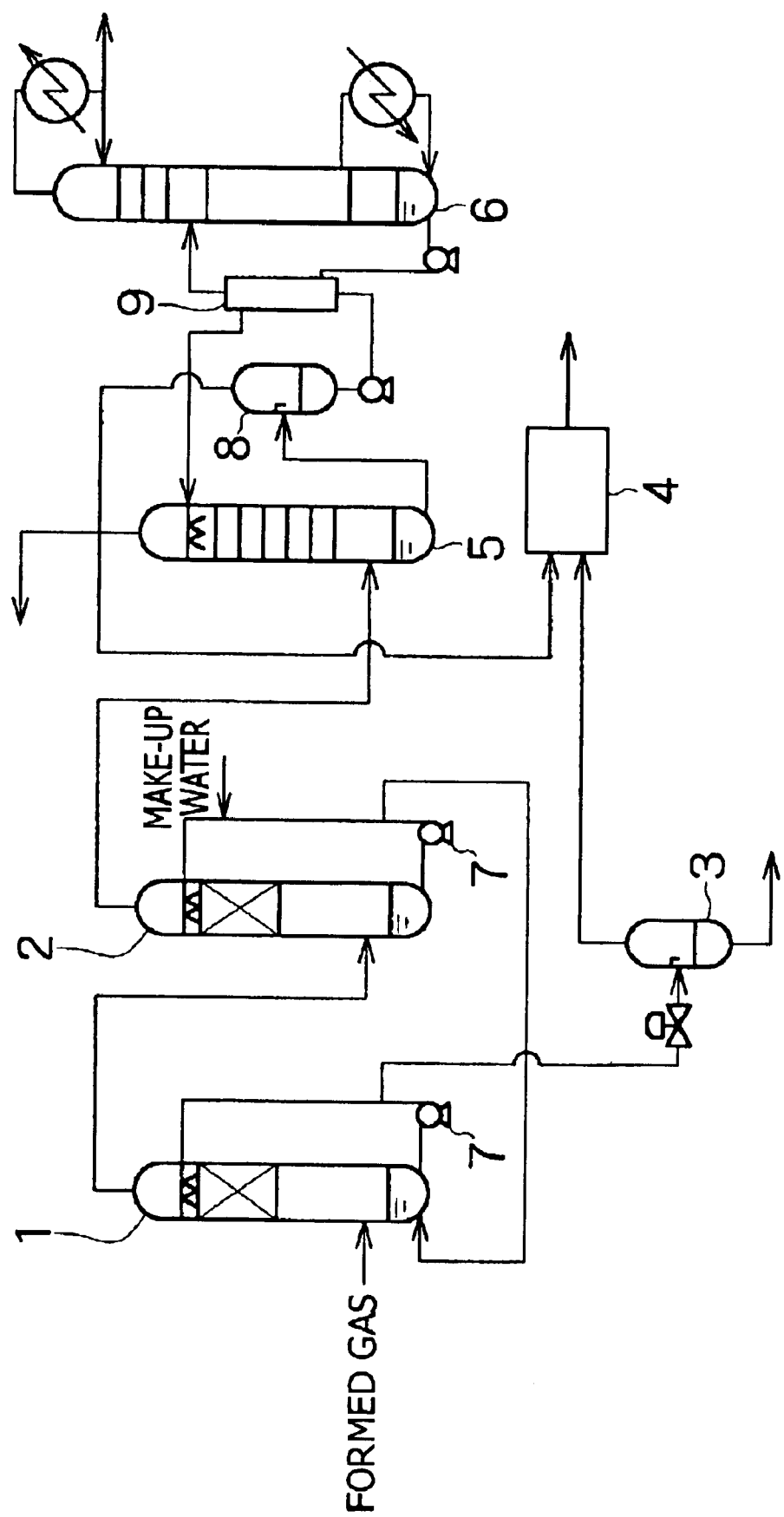
FIG. 1 is a diagram illustrating an outline of a system suitable for carrying out the wet gas purification process of the present invention.

The reference numerals shown in these figures are defined as follows: 1 Gas cooling tower; 2 Gas cleaning tower; 3 Flash drum; 4 Mercury remover; 5 Hydrogen sulfide absorption tower; 6 Absorption fluid regeneration tower; 7 Circulating pump; 8 Flash drum; 9 Absorbing fluid heat exchanger; 10 Gasification furnace; 11 Cyclone; 12 Filter; 13 COS converter; 14 Gas-gas heat exchanger; 15 Mercury remover; 20,21 Flash drum.

DETAILED DESCRIPTION OF THE INVENTION

A specific embodiment of the wet gas purification process in accordance with the present invention will be described hereinbelow with reference to the accompanying drawings.

FIG. 1 schematically illustrates an exemplary system in accordance with this embodiment which is suitable for carrying out the mercury removal method of the present invention during wet gas purification. In the system of this embodiment, the water washing step comprises a cooling step and a cleaning step. The cooling step is carried out in a gas cooling tower 1, and the cleaning step is carried out in a gas cleaning tower 2. Water used to absorb the ammonia component present in the gas is introduced, for example, into gas cleaning tower 2. These two water washing towers serve to remove ammonia present in the gas by absorption into an absorbing fluid. The water introduced into gas cleaning tower 2 is circulated by means of a pump 7 and acts as an absorbing fluid for absorbing ammonia. A portion thereof is fed to gas cooling tower 1 installed on the upstream side with respect to the direction of gas flow, and is also circulated through the tower by means of a pump 7. The present invention may also be practiced in an embodiment in which the cooling and cleaning steps are carried out in a single water washing tower. Alternatively, sulfuric acid may be added to the absorbing fluid within gas cooling tower 1.

In the above-described water washing step for the removal of ammonia, when mercury components are contained in the introduced gas and not less than 10 ppm of hydrogen sulfide is also contained therein, the mercury components pass into the absorbing fluid under pressurized conditions in the water washing towers (i.e., the cooling tower and the cleaning tower). Since the passage of mercury components into the absorbing fluid is influenced by temperature, the degree of mercury removal from the gas is enhanced as the temperature of the fluid becomes lower. Accordingly, it is believed that the degree of mercury removal is influenced by the temperatures of gas cooling tower 1 and gas cleaning tower 2, and the degree of mercury removal is enhanced as the temperature of gas cleaning tower 2 installed on the downstream side becomes lower. From the viewpoint of mercury removal, it is preferable to operate gas cleaning tower 2 usually at 50° C. or below and preferably at 40° C. or below.

Next, the mercury-containing absorbing fluid discharged from the above-described water washing step is transferred to a flashing step using a flash drum 3, in which it is sprayed under a lower pressure. Thus, the absorbing fluid is separated into gaseous components and waste water.

In such purification treatment systems, the waste water discharged from the water washing step generally has a high pressure and hence contains various gases dissolved therein. In order to treat such waste water, it is common practice to depressurize the waste water in flash drum 3 and thereby release it from the elevated pressure. Thus, the gases dissolved therein are once flashed and released into the gaseous phase. Then, the remaining solution is subjected to a waste water treatment.

Where an ordinary formed gas is treated, the flashed gas components are burned in a combustion furnace or discharged into the atmosphere. However, where the gas being treated according to the present invention is a mercury-containing gas, these gas components include mercury. The reason for this is believed that, when the absorbing fluid into which mercury has passed in the water washing step is sprayed under a lower pressure, the mercury, together with other gases, is suspended or dispersed in the gaseous phase.

Accordingly, the gaseous components separated in the aforesaid flash drum 3 are passed through a mercury remover 4 provided with an adsorbent (e.g., activated carbon). In this mercury remover 4, mercury components present in the gas are removed by adsorption to activated carbon used as the adsorbent. The exhaust gas from which mercury has been removed by passage through mercury remover 4 is then fed to an off-gas combustion furnace.

On the other hand, the mercury removal system of this embodiment as illustrated in FIG. 1 also serves to remove mercury components from the water-washed gas transferred from the aforesaid water washing towers to a hydrogen sulfide absorption tower.

In the above-described water washing step for the removal of ammonia, a certain proportion of mercury components pass from the mercury-containing gas into the absorbing fluid. However, some mercury components still remain in the water-washed gas and transferred to a further stage of the wet gas purification system. On the downstream side of the water washing step, there is provided a hydrogen sulfide removal step for removing hydrogen sulfide present in the gas. In this step, mercury components present in the gas are also removed. The hydrogen sulfide removal step includes an $H_2S$ absorption tower 5 and an absorbing fluid regeneration tower 6. The water-washed gas transferred from the water washing step is introduced into hydrogen sulfide absorption tower 5.

The main purpose of hydrogen sulfide absorption tower 5 is to remove hydrogen sulfide by absorption into an absorbing fluid containing an amine. According to this embodiment, in this hydrogen sulfide absorption tower 5, mercury components are allowed to pass from the mercury- and hydrogen sulfide-containing gas into the absorbing fluid under pressurized conditions (water washing step). Thus, the amine-containing absorbing fluid also contains mercury components. Accordingly, the absorbing fluid discharged from hydrogen sulfide absorption tower 5 is introduced into a second flash drum 8, in which it is sprayed under a lower pressure and separated into gaseous components and an absorbing fluid to be fed to the regeneration tower.

Subsequently, in the embodiment, the gaseous components separated in the aforesaid flash drum 8 are passed through mercury remover 4 provided with activated carbon, similarly to the gaseous components from the aforesaid flash drum 8. In this mercury remover 4, mercury components present in the gas are removed by adsorption to activated carbon. The exhaust gas from which mercury has been removed by passage through mercury remover 4 is then fed to an off-gas combustion furnace.

The gaseous components separated in flash drum 8 may be transferred to a second mercury remover installed separately from mercury remover 4 and treated by adsorption to activated carbon.

In addition to activated carbon, the adsorbent may comprise a chelate resin, elemental sulfur or a sulfur compound supported on a carrier comprising at least one compound selected from the group consisting of $Al_2O_3$, $TiO_2$ and $SiO_2$, or zeolite.

While several embodiments of the present invention have been described, it is to be understood that the present invention is not limited to the above-described embodiments, but various changes and modifications may be made without departing from the spirit and scope of the invention. The present invention is further illustrated by the following examples. However, these examples are not to be construed to limit the scope of the invention.

EXAMPLE 1

Figure 2:
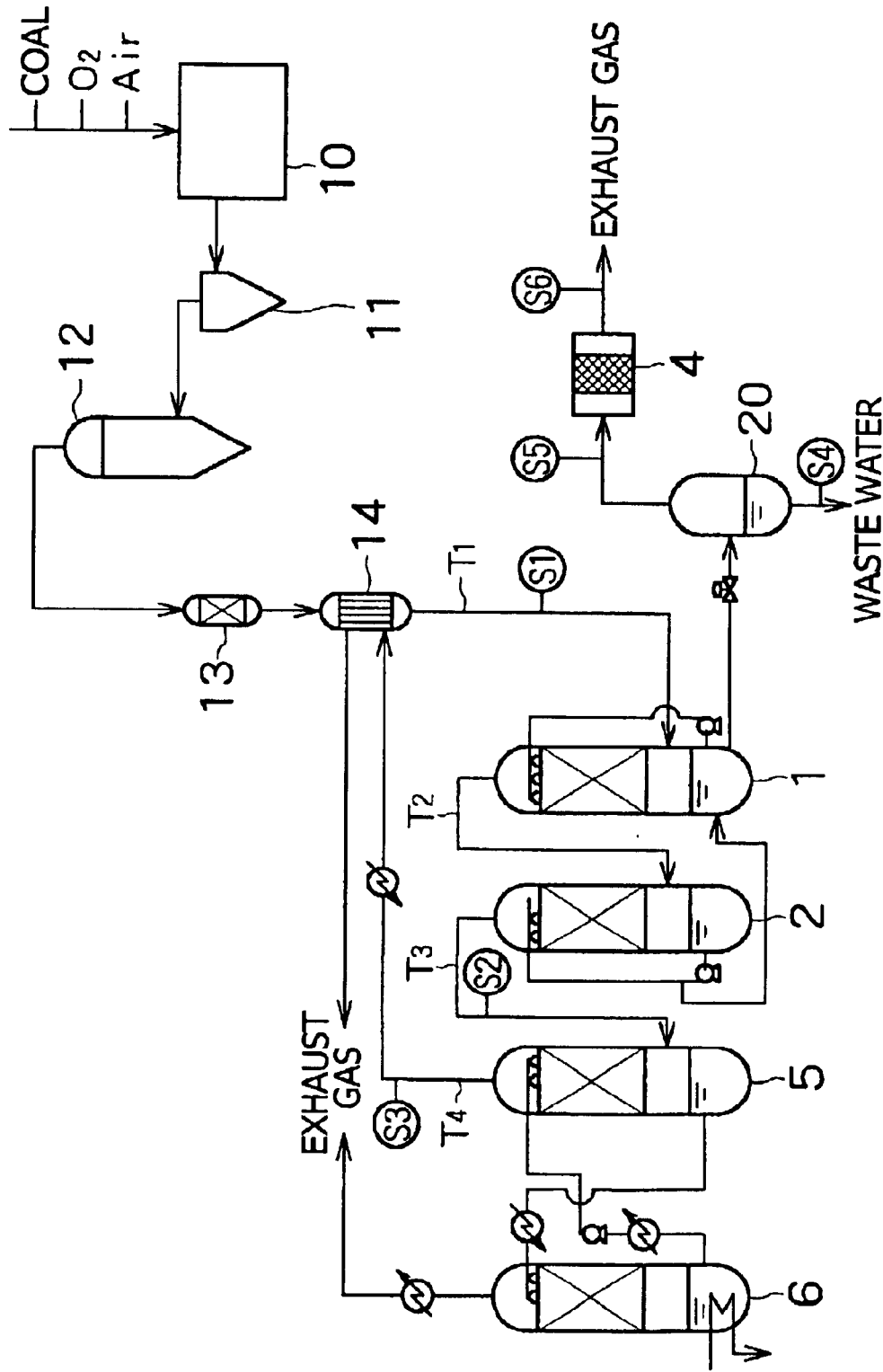
FIG. 2 is a diagram schematically showing the construction of the purification system used in Example 1.

FIG. 2 illustrates an outline of a wet gas purification system used in this example.

In a gasification furnace 10, coal fed thereto was converted to a gasification gas, which was passed through a cyclone 11 installed downstream thereof and then through a filter 12, and fed to a COS converter 13. The feed rate of coal was 10 kg/h. Subsequently, the formed gas passed through a gas—gas heat exchanger 14 and then introduced into a wet gas purification process. The pressure of the formed gas was 0.9 MPa and the flow rate thereof was 22.4 $m^3N/h(d)$. Prior to the water washing step, the formed gas had an $H_2S$ concentration of 800 to 1,000 ppm and a temperature ($T_1$) of about 200° C.

The water washing step includes two towers: a gas cooling tower 1 installed on the upstream side and a gas cleaning tower 2 installed on the downstream side as viewed from the direction of gas flow. The gas temperature ($T_2$) at the outlet of gas cooling tower 1 was 80° C., the flow rate of the fluid circulated through gas cooling tower 1 was 60 l/h, and the flow rate of waste waster from gas cooling tower 1 was 1.9 l/h. Moreover, the gas temperature ($T_3$) at the outlet of gas cleaning tower 2 was 40° C., and the flow rate of the fluid circulated through gas cleaning tower 2 was 100 l/h.

The mercury-containing absorbing fluid discharged from the water washing step was sprayed in a flash drum 20. The separated gaseous components were introduced into a mercury remover 4, where mercury was removed from the gas. The amount of the gas flashed from waste water was 30 1N/h.

On the other hand, the gas freed of ammonia in the water washing step was fed to a hydrogen sulfide absorption tower 5. The gas temperature ($T_4$) at the outlet of $H_2S$ absorption tower 5 was 40° C., and the flow rate of the fluid circulated through $H_2S$ absorption tower 5 was 30 l/h.

With respect to the above-described system of FIG. 2, Hg concentrations were measured at various positions S1 to S6 in the system. The results thus obtained are shown in Table 1 below.

TABLE 1

| Item | |
|---|---|
| Hg concentration at gas cooling tower inlet, S1 ($mg/m^3N$) | 0.0056 |
| Hg concentration at gas cleaning tower outlet, S2 ($mg/m^3N$) | 0.0014 |

TABLE 1-continued

| Item | |
|---|---|
| Hg concentration at H$_2$S absorption tower outlet, S3 (mg/m$^3$N) | 0.0004 |
| Hg concentration in waste water from gas cooling tower, S4 (mg/l) | 0.001 |
| Hg concentration in flashed gas from waste water, S5 (mg/m$^3$N) | 3.0 |
| Hg concentration at Hg adsorption remover outlet, S6 (mg/m$^3$N) | <0.01 |

The difference between concentrations S1 and S2 given in Table 1 (i.e., S1–S2) is the amount of mercury which was removed by the water washing step. Moreover, when the gaseous components separated by flashing waste water were passed through mercury remover 4, the mercury concentration was reduced from 3.0 mg/m$^3$N (S5) to less than 0.01 mg/m$^3$N (S6). It has been confirmed by these results that mercury passes into the waste water discharged from the water washing step and mercury components can be effectively removed from the gaseous components separated by flashing the waste water.

EXAMPLE 2

Figure 3:
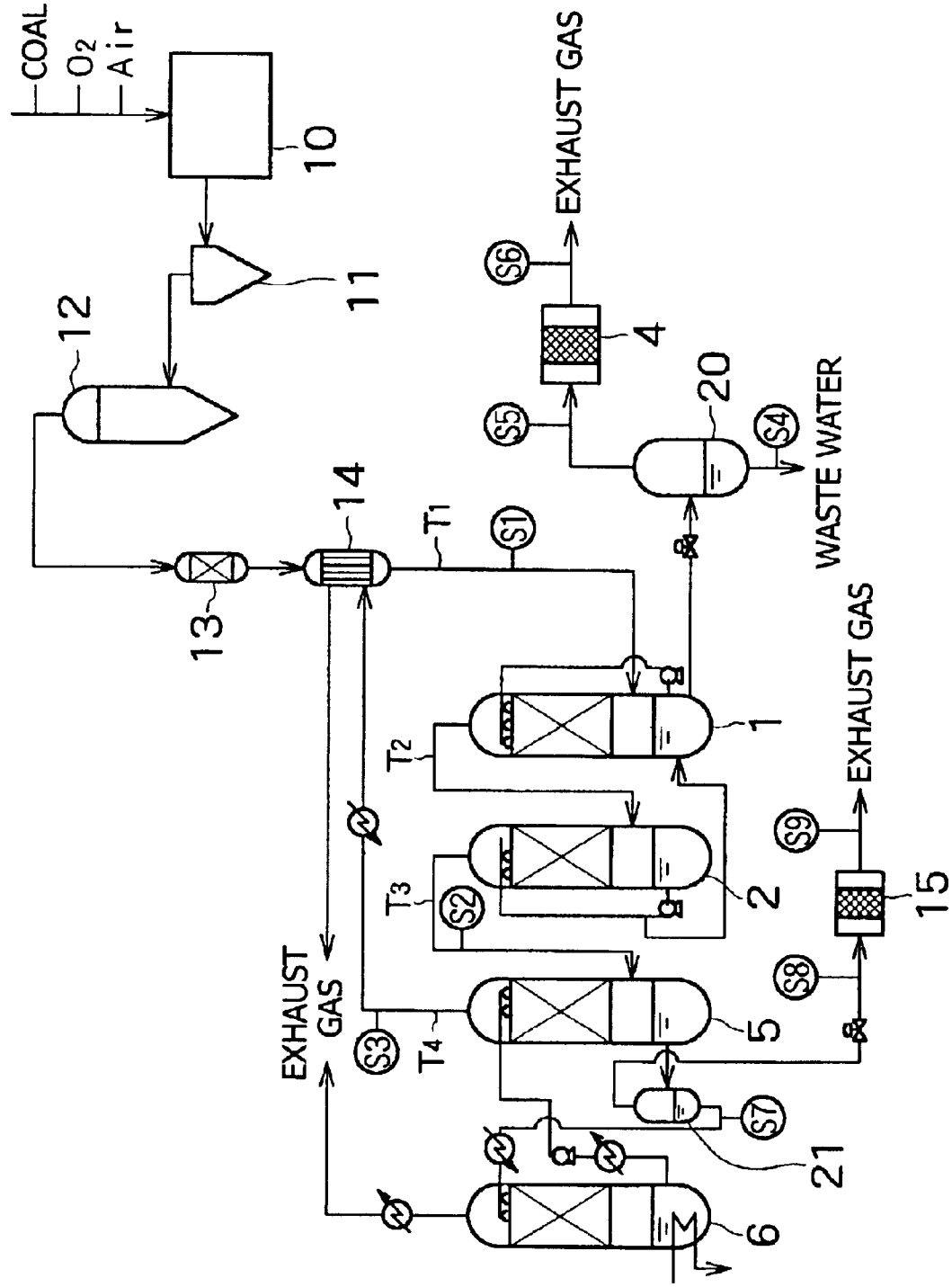
FIG. 3 is a diagram schematically showing the construction of the purification system used in Example 2.

FIG. 3 illustrates an outline of a wet gas purification system used in this example.

In addition to the system of Example 1, this example includes an additional step in which the mercury (Hg) removed into the absorbing fluid in hydrogen sulfide absorption tower 5 was introduced into a flash drum 21 to release it into the gaseous phase and then removed by means of a mercury remover 15 using activated carbon or the like. The conditions concerning the formed gas and the flow rates and temperatures employed in the water washing step were the same as those described in Example 1. The amount of the gas separated by flashing the H$_2$S absorbing gas in flash drum 21 was 50 1N/h.

With respect to the above-described system of FIG. 3, Hg concentrations were measured at various positions S1 to S9 in the system. The results thus obtained are shown in Table 2 below.

TABLE 2

| Item | |
|---|---|
| Hg concentration at gas cooling tower inlet, S1 (mg/m$^3$N) | 0.0056 |
| Hg concentration at gas cleaning tower outlet, S2 (mg/m$^3$N) | 0.0014 |
| Hg concentration at H$_2$S absorption tower outlet, S3 (mg/m$^3$N) | 0.0004 |
| Hg concentration in waste water from gas cooling tower, S4 (mg/l) | 0.001 |
| Hg concentration in flashed gas from waste water, S5 (mg/m$^3$N) | 3.0 |
| Hg concentration at Hg adsorption remover outlet, S6 (mg/m$^3$N) | <0.01 |
| Hg concentration in H$_2$S absorbing fluid, S7 (mg/l) | <0.005 |
| Hg concentration in flashed gas from H$_2$S absorbing fluid, S8 (mg/m$^3$N) | 0.45 |
| Hg concentration at Hg adsorption remover outlet, S9 (mg/m$^3$N) | <0.01 |

The difference between concentrations S2 and S3 given in Table 2 (i.e., S2–S3) is the amount of mercury which was removed by washing with the absorbing fluid within the hydrogen sulfide absorption tower. Moreover, when the gaseous components separated by flashing the absorbing fluid were passed through mercury remover 15, the mercury concentration was reduced from 0.45 mg/m$^3$N (S8) to less than 0.01 mg/m$^3$N (S9). It has been confirmed by these results that, also in the hydrogen sulfide absorption step subsequent to the water washing step, mercury passes into the absorbing fluid and mercury components can be effectively removed from the gaseous components separated by flashing the absorbing fluid.

EXAMPLE 3

Figure 4:
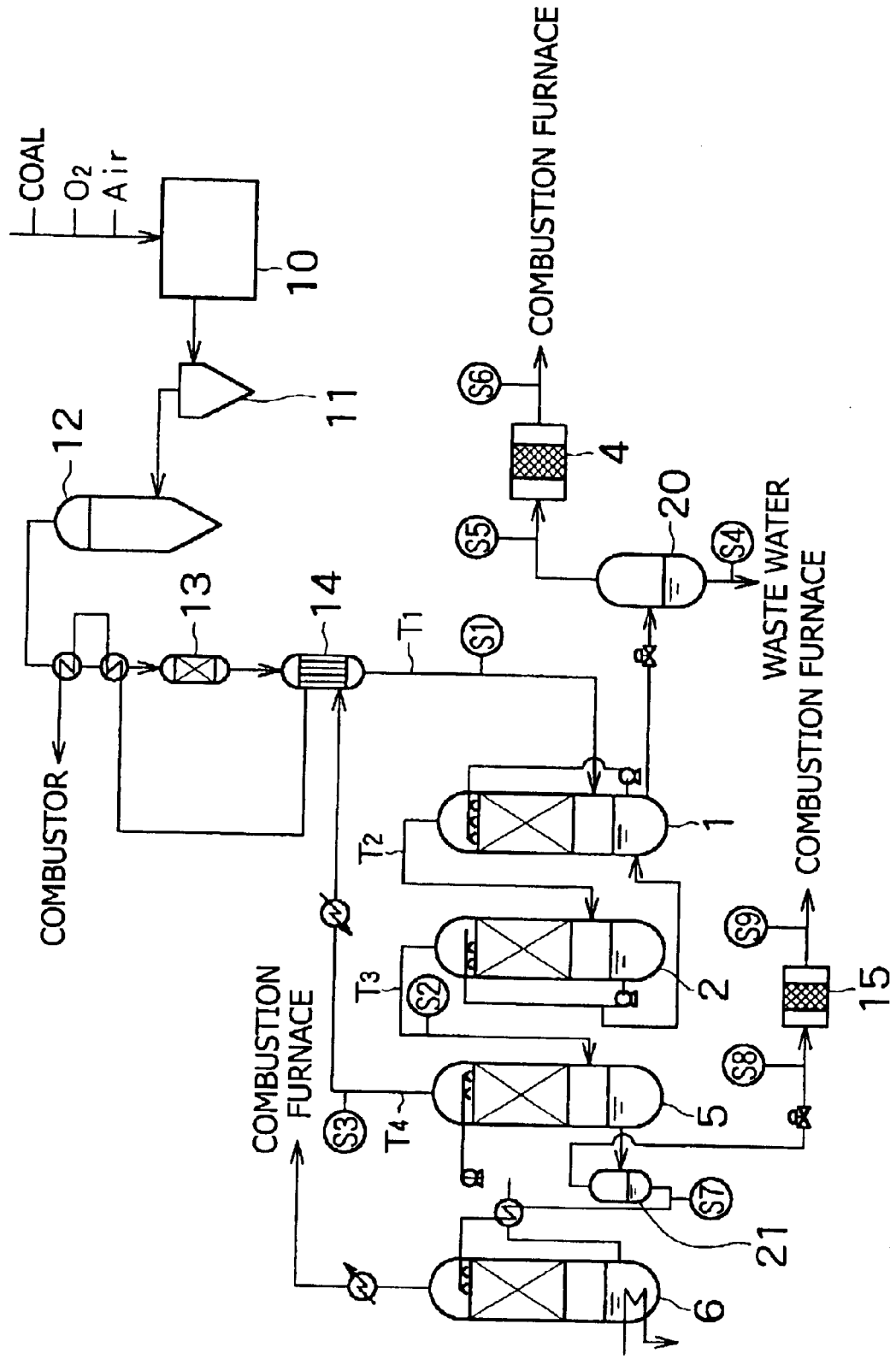
FIG. 4 is a diagram schematically showing the construction of the purification system used in Example 3.

FIG. 4 illustrates an outline of a wet gas purification system used in this example.

In addition to the system of Example 2, this example includes an additional step in which the exhaust gas having passed through gas—gas heat exchanger 14, which was directly discharged in Example 2, was passed through heat exchangers and then burned in a combustor. In this example, the feed rate of coal was 1,000 kg/h, the flow rate of the formed gas was 3,500 m$^3$N/h, the H$_2$S concentration in the formed gas was 800 to 1,000 ppm, the gas temperature (T$_2$) at the outlet of gas cooling tower 1 was 40° C., the flow rate of the fluid circulated through gas cooling tower 1 was 8.4 tons/h, the flow rate of waste waster from gas cooling tower 1 was 0.4 ton/h, the amount of the flashed gas produced from waste water in flash drum 20 was 0.2 m$^3$N/h, the gas temperature (T$_3$) at the outlet of gas cleaning tower 2 was 40° C., the flow rate of the fluid circulated through gas cleaning tower 2 was 10 tons/h, the gas temperature (T$_4$) at the outlet of H$_2$S absorption tower 5 was 40° C., the flow rate of the fluid circulated through H$_2$S absorption tower 5 was 3.6 tons/h, and the amount of the flashed gas produced from the H$_2$S absorbing fluid was 1.6 m$^3$N/h. Other conditions were the same as in

EXAMPLE 2

With respect to the above-described system of FIG. 4, Hg concentrations were measured at various positions S1 to S9 in the system. The results thus obtained are shown in Table 3 below.

TABLE 3

| Item | |
|---|---|
| Hg concentration at gas cooling tower inlet, S1 (mg/m$^3$N) | 0.005 |
| Hg concentration at gas cleaning tower outlet, S2 (mg/m$^3$N) | 0.0013 |
| Hg concentration at H$_2$S absorption tower outlet, S3 (mg/m$^3$N) | 0.0003 |
| Hg concentration in waste water from gas cooling tower, S4 (mg/l) | <0.005 |
| Hg concentration in flashed gas from waste water, S5 (mg/m$^3$N) | 63 |
| Hg concentration at Hg adsorption remover outlet, S6 (mg/m$^3$N) | <0.01 |
| Hg concentration in H$_2$S absorbing fluid, S7 (mg/l) | <0.005 |
| Hg concentration in flashed gas from H$_2$S absorbing fluid, S8 (mg/m$^3$N) | 2.2 |
| Hg concentration at Hg adsorption remover outlet, S9 (mg/m$^3$N) | <0.01 |

It has been confirmed by these results that, even when a large volume of formed gas is subjected to wet gas purification, the mercury removal method of the present invention can reduce the Hg concentration in exhaust gas to less than 0.01 mg/m$^3$N at all of positions S6 to S9.

According to the mercury removal method of the present invention, the volume of gas being treated can be markedly decreased by treating flashed gas, and the operating cost required for the treatment can also be reduced, as compared with the case in which the formed gas is directly treated. Moreover, since no energy supply to the mercury removal (or absorption) step and the Hg flashing step is required for the purpose of mercury removal, Hg can be positively removed without modifying an ordinary purification system substantially.

Furthermore, the adsorbent for the adsorption of Hg can be used at low temperatures (400° C. or below) and only a small amount of adsorbent is required because of its high rate of Hg removal. In addition, since a gas once dissolved in water is treated with activated carbon, hydrocarbons and other substances capable of inhibiting Hg adsorption are not present therein.

What is claimed is:

1. A mercury removal method for the removal of mercury present in a gas, said method comprising the steps of:
   bringing the gas containing at least 10 ppm of hydrogen sulfide and mercury into gas-liquid contact with an absorbing fluid under pressurized conditions so as to cause mercury to pass into the absorbing fluid;
   flashing the mercury-containing absorbing fluid under lower-pressure conditions to separate it into gaseous components and liquid components; and
   removing the mercury contained in the separated gaseous components by adsorption to an adsorbent.

2. The mercury removal method as claimed in claim 1, further comprising:
   bringing the gas freed partially of mercury into gas-liquid contact with ea another absorbing fluid containing an amine compound so as to cause hydrogen sulfide and mercury present in the gas to be absorbed into the another absorbing fluid;
   flashing the absorbing fluids under a lower pressure to separate them into mercury-containing gas and liquid; and
   removing mercury from the mercury-containing gases by adsorption to the adsorbent.

3. The mercury removal method as claimed in claim 1 or 2, wherein the gas containing at least 10 ppm of hydrogen sulfide and mercury comprises coal gasification gas or heavy oil gasification gas.

4. The mercury removal method as claimed in claim 1 or 2 wherein the adsorbent comprises a chelate resin, elemental sulfur or a sulfur compound supported on a carrier comprising at least one compound selected from the group consisting of $Al_2O_3$, $TiO_2$ and $SiO_2$, activated carbon or zeolite.

5. A mercury removal method for the removal of mercury components present in a gas during wet gas purification, said method comprising:
   a water washing step bringing the gas containing mercury components and not less than 10 ppm of hydrogen sulfide into contact with an absorbing fluid under pressurized conditions so as to cause mercury components to pass from the gas into the absorbing fluid;
   a flashing step subsequent to the water washing step spraying the discharged absorbing fluid under a lower pressure to separate it into gaseous components and waste water; and
   an adsorption removal step passing the gaseous components through a mercury remover provided with an adsorbent to remove mercury components therefrom by adsorption.

6. The mercury removal method as claimed in claim 5 wherein the adsorbent comprises a chelate resin, elemental sulfur or a sulfur compound supported on a carrier comprising at least one compound selected from the group consisting of $Al_2O_3$, $TiO_2$ and $SiO_2$, activated carbon or zeolite.

7. A mercury removal system for the removal of mercury present in a gas during wet gas purification, said system comprising:
   a water washing tower in which the gas containing both mercury components and hydrogen sulfide is introduced and an absorbing fluid is circulated through the tower under pressurized conditions so as to cause mercury components to pass into the absorbing fluid;
   a flash drum in which the absorbing fluid discharged from the water washing tower is sprayed under a lower pressure to separate it into gaseous components and waste water; and
   a mercury remover provided with an adsorbent in which the mercury components present in the gaseous components are removed by adsorption.

8. The mercury removal system as claimed in claim 7, further comprising:
   a hydrogen sulfide absorption tower in which the water-washed gas fed from the water washing tower is introduced and an absorbing fluid containing an amine compound is used to remove hydrogen sulfide by absorption into the absorbing fluid;
   a second flash drum in which the absorbing fluid discharged from the hydrogen sulfide absorption tower is sprayed under a lower pressure to separate it into gaseous components and an absorbing fluid to be fed to a regeneration tower; and
   a mercury remover provided with the adsorbent in which the mercury components present in the gaseous components delivered from the second flash drum are removed by adsorption.

9. The mercury removal system as claimed in claim 7 or 8, wherein the adsorbent comprises a chelate resin, elemental sulfur or a sulfur compound supported on a carrier comprising at least one compound selected from the group consisting of $Al_2O_3$, $TiO_2$ and $SiO_2$, activated carbon or zeolite.

10. The mercury removal method as claimed in claim 3, wherein the adsorbent comprises at least one of a chelate resin, elemental sulfur, and a sulfur compound supported on a carrier comprising at least one of $Al_2O_3$, $TiO_2$, $SiO_2$, activated carbon, and zeolite.

* * * * *

UNITED STATES PATENT AND TRADEMARK OFFICE
CERTIFICATE OF CORRECTION

PATENT NO. : 6,770,119 B2
DATED : August 3, 2004
INVENTOR(S) : Harada et al.

It is certified that error appears in the above-identified patent and that said Letters Patent is hereby corrected as shown below:

<u>Title page,</u>
Item [75] Inventors, should read -- [75] Inventor: Masahiro Harada, Tokyo (JP); Shintaro Honjo, Hiroshima (JP); Makoto Susaki, Tokyo (JP); Kazuo Ishida, Tokyo (JP); Hajime Nagano, Tokyo (JP); Susumu Okino, Tokyo (JP) --

Signed and Sealed this

Thirty-first Day of May, 2005

JON W. DUDAS
*Director of the United States Patent and Trademark Office*